2,613,753

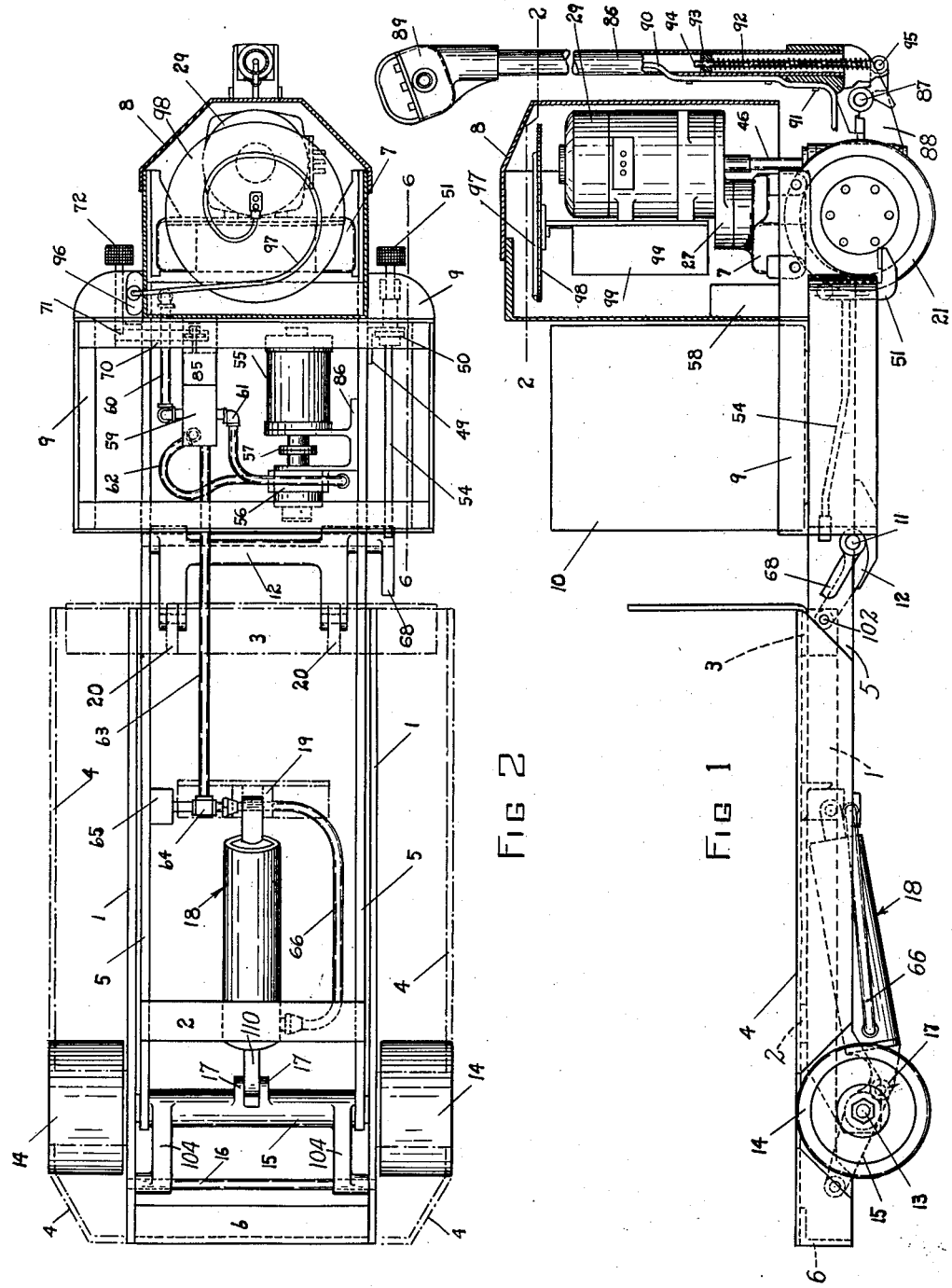
Oct. 14, 1952  W. C. STUEBING, JR  2,613,753
MOTORIZED DRIVE WHEEL ASSEMBLY FOR LIFT TRUCKS OR THE LIKE
Filed Sept. 26, 1946  3 Sheets-Sheet 1
INVENTOR
Walter C. Stuebing, Jr.
BY
Blair, Curtis + Hayward
ATTORNEYS Patented Oct. 14, 1952

UNITED STATES PATENT OFFICE 2,613,753

MOTORIZED DRIVE WHEEL ASSEMBLY FOR LIFT TRUCKS OR THE LIKE

Walter C. Stuebing, Jr., Cincinnati, Ohio

Application September 26, 1946, Serial No. 699,569

8 Claims. (Cl. 180—54)

This invention relates to lift trucks, and more in particular to motorized lift trucks which are provided with swinging steering handles where the operator walks and steers the truck.

An object of this invention is to provide a lift truck which is compact, light in weight and sturdy in construction, and which is inexpensive to manufacture and maintain. A further object is to provide a lift truck of the above character which is easy to operate and efficient under all conditions of use. These and other objects will be in part obvious and in part pointed out below.

In the drawings:

Figure 1 is a side view with parts broken away of one embodiment of the invention;

Figure 2 is a top view of the truck with parts broken away and with the right-hand portion of the figure in section on the line 2—2 of Figure 1;

Figure 3:
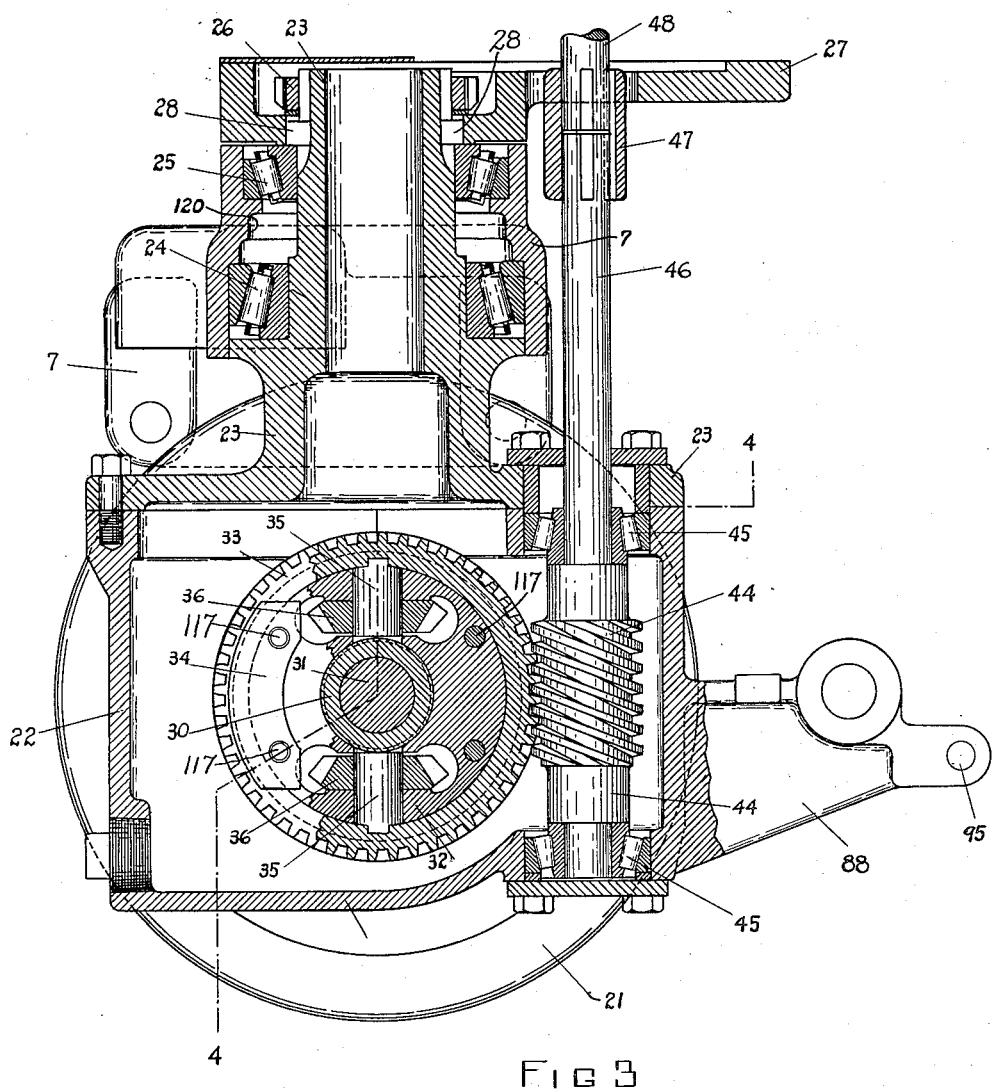
Figure 3 is an enlarged vertical section of the gear-drive mechanism at the front end of the truck.

Referring particularly to Figures 1 and 2 of the drawings, the truck has a lower frame which forms part of the chassis and a lifting frame which is swingably mounted on the lower frame. The lifting frame is formed by a pair of side rails 1 (Figure 2), a rear tie bar 6, a front tie bar 3 and a top plate 4. The lower frame is formed by a pair of side rails 5, a rear tie bar 2 and the head assembly 7. The rear of the truck is supported by a pair of wheels 14 journaled on a shaft 13 which is fixed in rails 5 of the lower frame. For further details as to the truck chassis structure and lifting mechanism, reference is made to my co-pending divisional application, Serial No. 208,895, filed February 1, 1951. The forward end of the truck is supported on a pair of wheels 21 which are pivoted to provide for the steering of the truck and which are also the drive wheels through which the truck is driven.

Figure 4:
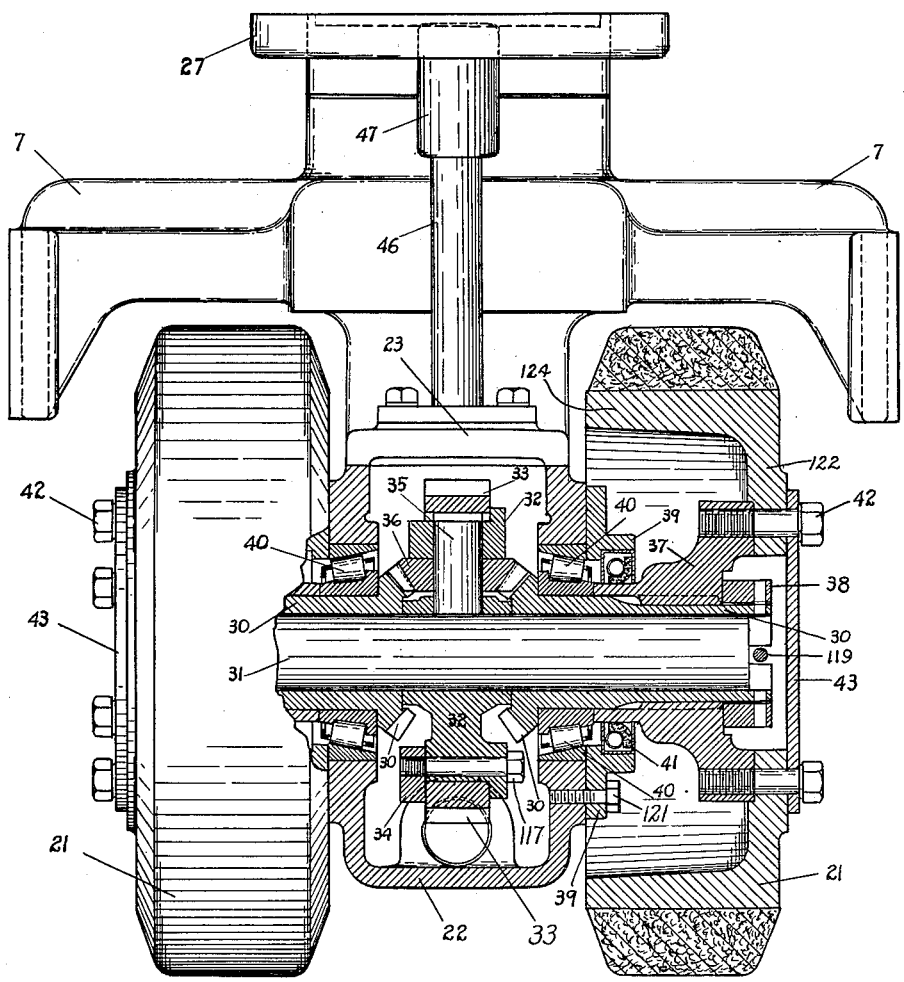
Figure 4 is a view from the right-hand side of Figure 3 with parts broken away along the line 4—4 of Figure 3.

As indicated above, the front end of the truck is supported by a pair of wheels 21, the mounting of which is best shown in Figures 3 and 4. Referring particularly to Figure 3, the wheels are carried on a floating axle 31 in a yoke 22 which has a hollow stud shaft or bonnet 23 projecting upwardly and received in an opening 120 in head 7 of the lower frame. Bonnet 23 carries at its upper end a motor plate 27 which is keyed to the bonnet by keys 28 and is held in place by a lock nut 26. A non-friction journal is provided between yoke 22 and head 7 by a lower row of roller bearings 24 and an upper row of roller bearings 25.

The lower portion of yoke 22 forms a gear box which encloses a differential gear assembly through which wheels 21 are rotated to drive the truck. This differential gear assembly is formed by two main gears 30 (see Figure 4) loosely mounted on shaft 31 and having hub sleeves which extend respectively beyond the two ends of the shaft. Loosely mounted between these gears on shaft 31 is a spider 32 which carries a ring gear 33 held in place by a pair of plates 34 which are clamped to spider 32 by stud bolts 117. Spider 32 carries a pair of oppositely disposed radial pins 35 each of which has loosely mounted thereon a pinion gear 36. Each of gears 36 meshes on its opposite sides with gears 30 so as to provide a differential drive between ring gear 33 and gears 30.

As indicated above, gears 30 have integral hub sleeves which project beyond the respective ends of shaft 31. The outer end of each of these hub sleeves has keyed to it the hub 37 of its wheel 21, and each hub 37 is locked onto its hub sleeve by a cylinder nut 38 threaded onto the end of the hub sleeve and locked in place by a bolt 119. The main portion of each wheel 21 comprising a web portion 122 and a rim portion 124 surrounding and overhanging the hub is clamped to its hub 37 by six stud bolts 42, and these stud bolts also clamp in place a cover plate 43 which seals the end of shaft 31 and the adjacent parts. Each of gears 30 is rotatably mounted in yoke 22 by a set of roller bearings 40, and the ends of hubs 37 which are adjacent yoke 22 are surrounded by sealing rings 41, the outer peripheries of which are fixed to sealing discs 39 which are clamped to yoke 22 by a plurality of cap screws 121.

Mounted on motor plate 27 and thus fixed to yoke 22 is the driving motor 29 which has a downwardly projecting shaft 46 extending into the gear box of yoke 22. Referring to Figure 3, shaft 46 carries a worm gear 44 which meshes with ring gear 33. Referring again to Figure 1, above motor 29 is a horizontal disc 98 upon which a spiral of loose cable 97 rests. The inner end of this spiral is fixed to the disc and extends down through the disc and to the motor starting box 99. The outer end of this spiral (Figure 2) extends through switching mechanism 96 through which electric power is supplied for driving motor 29. Motor 29 and starting box 99 are enclosed in a fixed casing 8 and at the left of this casing is a battery 10 which supplies power for driving motor 29. Battery 10 rests on a cradle 9 carried by the lower frame.

As shown at the right in Figure 3, yoke 22 has integral therewith a steering tongue bracket 88 which (see Figure 1) provides the pivotal mounting for the steering tongue 86. Bracket 88 carries a pin 87 which extends through ears in the steering tongue and the bracket also carries a pin 95 upon which is pivoted a rod 94 which projects upwardly into the steering tongue and is received in a collar 93. Coiled about rod 94 is a compression spring 92 which bears at its upper end against collar 93 and at its lower end against the top of bracket 88. Thus, as the tongue swings downwardly the spring is compressed and exerts a constantly increasing balancing effect so as to counterbalance the weight of the steering tongue. At the end of the steering tongue is a control head 89 which carries a set of manually operable push button switches by means of which the driving of the truck is controlled.

The electrical circuits associated with these push button switches operate to selectively energize in proper sequence the four main series field windings and the compensating winding of the motor to give the desired control of the truck.

Thus it is seen that a truck is obtained that can be easily steered with or without power. Also the inherent greater stability of a two wheel drive system is obtained without the "scrubbing" of the conventional front wheel drive, since the dual wheels are free to rotate in opposite directions as the driving assembly is turned about the axis of swivel.

In addition by positioning the drive shaft outside the axis of swivel the tendency of the drive assembly to turn upon application of power, as in drives within the axis of swivel, is materially reduced.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. In a truck structure of the character described, the combination of, a drive wheel assembly comprising a vertically projecting journal member which is adapted to provide for pivotal movement of the assembly about a vertical axis, a gear box rigidly fixed to said journal and positioned therebeneath, an axle shaft projecting horizontally through said gear box, a spider journalled on the central portion of said shaft, a plurality of pinions mounted in said spider with their axes positioned radially with respect to said shaft, a ring gear mounted on said spider and rigidly fixed thereto, a worm gear having its axis projecting substantially parallel to said vertical axis of the journal member, said worm gear being meshed with said ring gear to impart driving movement thereto, a pair of differential gears mounted on said shaft on the opposite sides of said spider and meshing with the opposite sides of said pinions whereby rotation of said ring gear imparts differential rotation to said differential gears, each of said differential gears having a sleeve portion which projects away from said spider and surrounds the respective portion of said axle shaft, a pair of wheels having hubs mounted respectively on said sleeve portions of said pair of differential gears, removable cover means fixed to each of said wheels and covering the ends of said sleeve portions of the differential gears and the shaft, and a pair of supporting bearings and grease seal assemblies mounted respectively on said sleeve portions and each providing a sealed bearing support from the gear box.

2. In a truck structure of the character described, the combination of, a casing structure formed by a gear box at the bottom having an integral bracket to which a steering handle may be attached and an upwardly projecting journal portion which is adapted to provide for pivotal movement and which has a bearing receiving portion upon which journal bearings may be mounted, a plurality of journal bearings mounted on said journal portion and providing for said pivotal movement, a stationary frame member having an opening through which said journal portion projects and providing mating surfaces for said journal bearings, a motor plate fixed to the upper end of said journal portion and adapted to rotate therewith and including a motor mounting bracket projecting forwardly with respect to said vertical axis of the journal portion, a vertical driving shaft rotatably mounted and projecting from the central portion of said motor mounting bracket downwardly into said gear box, a worm gear fixed to the lower end of said vertical driving shaft and mounted in bearings adjacent the top and bottom of said gear box, an axle shaft projecting horizontally through said gear box substantially at the level of the center of said worm gear, a spider journalled on the central portion of said axle shaft, a plurality of beveled pinions mounted in said spider with their axes positioned radially with respect to said axle shaft, a ring gear mounted on said spider and meshing with said worm gear, a pair of differential gears journalled on said axle shaft on the opposite sides of said spider and meshing with said pinions whereby rotation of said worm gear is transmitted through said spider to impart differential rotation to said differential gears, each of said differential gears having a sleeve portion which projects away from said spider through the adjacent wall of said gear box where it cooperates with the end of said axle shaft to provide a wheel mounting, means providing a sealed bearing support for each of said sleeve portions from the respective gear box walls, and a pair of wheels fixed respectively to said sleeve portions.

3. Apparatus as described in claim 2 wherein each of said wheels comprises a hub portion enclosing and keyed to the outer surface of its sleeve portion and a removable web and rim portion fixed to said hub portion adjacent the end of said sleeve portion, said rim comprising a cylindrical portion integral with said web and which overhangs said hub portion.

4. Apparatus as described in claim 3 wherein each of the means providing the sealed bearing support comprises a roller bearing assembly mounted between the gear box wall and the sleeve portion and an annular oil seal mounted between the gear box wall and the wheel hub.

5. Apparatus as described in claim 2 which includes, an electric motor mounted on said motor mounting bracket with its shaft concentrically positioned with respect to said driving shaft and a control box mounted on said motor on the side of said vertical axis of the journal portion opposite said driving shaft.

6. Apparatus as described in claim 2 wherein each of said wheels and the structure associated therewith comprises a hub portion snugly enclosing a central portion of its sleeve portion with the sleeve portion projecting beyond the hub portion, a web and rim portion comprising an annular web portion projecting outwardly from said hub portion and a cylindrical portion substantially surrounding said hub portion and spaced therefrom, a rubber tire mounted on said substantially cylindrical portion, a cylindrical nut clamping said hub portion in fixed relationship with respect to its sleeve portion and a cover plate removably mounted to cover the opening formed by said web portion.

7. In a truck structure of the character described, the combination of, a casing structure having a handle attaching bracket fixed thereto to which a steering handle may be attached, said casing structure including a gear box and an upwardly projecting pivotal portion which is adapted to provide for pivotal movement and which has a bearing portion for bearing means which provides for said pivotal movement about a pivot axis, a stationary frame member having means cooperating with said pivotal portion and providing mating surfaces for said bearing means, a vertical driving shaft, means rotatably mounting said vertical driving shaft so that it projects downwardly with its axis spaced from said pivot axis, a worm gear fixed to the lower end of said vertical driving shaft, an axle shaft projecting horizontally through said gear box, a differential drive gear assembly mounted on the central portion of said axle shaft and including a pair of driven gears mounted on said axle shaft at the opposite sides of said differential drive gear assembly and operatively connected whereby rotation of said worm gear is transmitted through said differential drive gear assembly to impart differential rotation to said driven gears, each of said driven gears having a sleeve portion which projects away from said differential drive gear assembly through the adjacent wall of said gear box where it cooperates with the end of said axle shaft to provide a wheel mounting, and bearing means mounted on said gear box and providing a sealed bearing support for each of said sleeve portions.

8. In a truck structure of the character described, the combination of, a casing structure having a handle attaching bracket fixed thereto to which a steering handle may be attached, said casing structure including a gear box and an upwardly projecting pivotal portion which is adapted to provide for pivotal movement and which has a bearing portion for bearing means which provides for said pivotal movement about a pivot axis, a stationary frame member having means cooperating with said pivotal portion and providing mating surfaces for said bearing means, a vertical driving shaft, means rotatably mounting said vertical driving shaft so that it projects downwardly with its axis spaced from said pivot axis, a worm gear fixed to the lower end of said vertical driving shaft, an axle shaft projecting horizontally through said gear box, a differential drive gear assembly mounted on the central portion of said axle shaft and including a pair of driven gears mounted on said axle shaft at the opposite sides of said differential drive gear assembly and operatively connected whereby rotation of said worm gear is transmitted through said differential drive gear assembly to impart differential rotation to said driven gears, each of said driven gears having a sleeve portion which projects away from said differential drive gear assembly through the adjacent wall of said gear box where it cooperates with the end of said axle shaft to provide a wheel mounting, a pair of wheels mounted on said sleeve portions comprising a web and an outer annular rim portion overhanging said wheel mounting, and bearing means mounted on said gear box and providing a sealed bearing support for each of said sleeve portions.

WALTER C. STUEBING, JR.

REFERENCES CITED

The following references are of record in the file of this patent:

UNITED STATES PATENTS

| Number | Name | Date |
| --- | --- | --- |
| 337,794 | Sprague | Nov. 9, 1886 |
| 770,631 | Eastwood | Sept. 20, 1904 |
| 1,315,217 | Eason et al. | Sept. 9, 1919 |
| 1,480,642 | Theoret | Jan. 15, 1924 |
| 2,327,583 | Framhein | Aug. 24, 1943 |
| 2,395,323 | Framhein | Feb. 19, 1946 |
| 2,417,394 | Framhein | Mar. 11, 1947 |